(12) United States Patent
Hicks

(10) Patent No.: US 9,579,781 B2
(45) Date of Patent: Feb. 28, 2017

(54) CHUCK KEY HANDLE ASSEMBLY

(71) Applicant: Paul E. Hicks, Fort Worth, TX (US)

(72) Inventor: Paul E. Hicks, Fort Worth, TX (US)

(*) Notice: Subject to any disclaimer, the term of this patent is extended or adjusted under 35 U.S.C. 154(b) by 330 days.

(21) Appl. No.: 14/282,222

(22) Filed: May 20, 2014

(65) Prior Publication Data

US 2015/0336252 A1    Nov. 26, 2015

(51) Int. Cl.
*B25B 33/00* (2006.01)
*B23B 45/00* (2006.01)

(52) U.S. Cl.
CPC .......... *B25B 33/005* (2013.01); *B23B 45/006* (2013.01); *Y10T 279/3443* (2015.01)

(58) Field of Classification Search
CPC ....... B25B 33/005; B25B 13/06; B25B 17/00; B23B 45/006; B23B 31/1207; B23B 2260/078; B23B 2231/06; B23B 2231/2081; B23B 2231/38
See application file for complete search history.

(56) References Cited

U.S. PATENT DOCUMENTS

| | | | |
|---|---|---|---|
| 2,592,094 A * | 4/1952 | Willenbring | B02C 17/00 248/300 |
| 2,690,690 A * | 10/1954 | Garton | B25B 33/005 81/16 |
| 3,457,813 A | 7/1969 | Mangas | |
| 4,085,943 A | 4/1978 | Travis | |
| 4,111,079 A | 9/1978 | Derbyshire | |
| 4,462,728 A | 7/1984 | Sturgis | |
| 4,467,677 A * | 8/1984 | Grifford | B25B 33/005 279/147 |
| 4,534,573 A | 8/1985 | Somers | |
| 4,634,321 A * | 1/1987 | McClelland | B23B 45/006 279/149 |
| 4,997,194 A * | 3/1991 | Krohn | B25B 33/005 279/149 |
| D322,740 S * | 12/1991 | McCart | D8/21 |
| 6,340,163 B1 | 1/2002 | Newman | |
| 2008/0088098 A1* | 4/2008 | Hsu | B23B 31/1207 279/149 |
| 2009/0289425 A1* | 11/2009 | Lin | B23B 31/1207 279/147 |
| 2011/0215539 A1 | 9/2011 | Van Der Linde et al. | |

FOREIGN PATENT DOCUMENTS

| | | |
|---|---|---|
| CN | 201752780 U | 3/2011 |
| CN | 202715857 U | 2/2013 |

* cited by examiner

*Primary Examiner* — Robert Scruggs

(57) ABSTRACT

A chuck key handle assembly for insertably receiving the chuck key wherein a user may apply an increased amount of rotational torque to a chuck on a tool includes a handle that may insertably receive the chuck key. The chuck key may engage a chuck on a tool. A rod is operationally coupled to the handle. The rod is gripped by a user. The user may rotate the handle after the chuck key engages the chuck.

10 Claims, 4 Drawing Sheets

CHUCK KEY HANDLE ASSEMBLY

BACKGROUND OF THE DISCLOSURE

Field of the Disclosure

The disclosure relates to handle devices and more particularly pertains to a new handle device for insertably receiving the chuck key wherein a user may apply an increased amount of rotational torque to a chuck on a tool.

SUMMARY OF THE DISCLOSURE

An embodiment of the disclosure meets the needs presented above by generally comprising a handle that may insertably receive the chuck key. The chuck key may engage a chuck on a tool. A rod is operationally coupled to the handle. The rod is gripped by a user. The user may rotate the handle after the chuck key engages the chuck.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
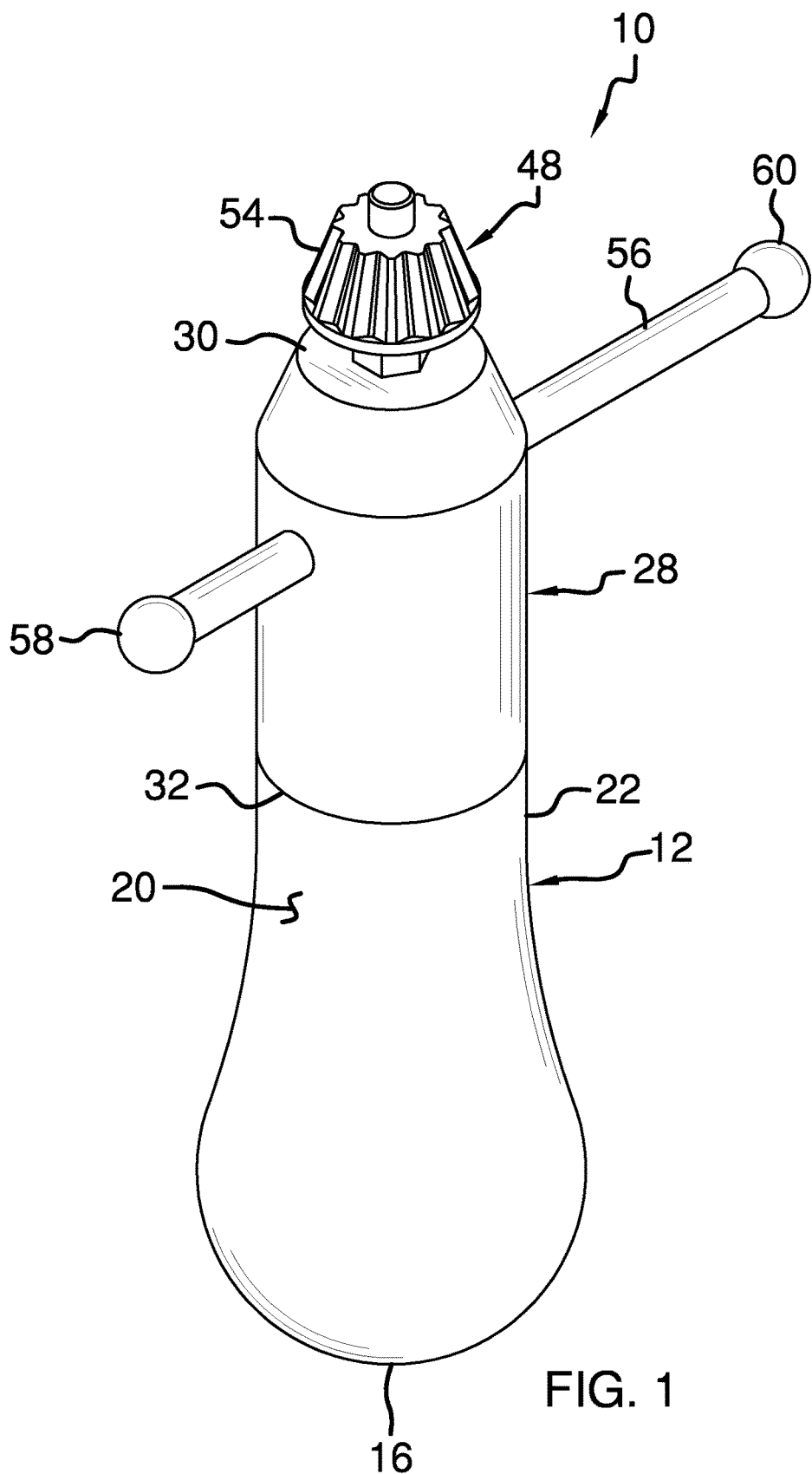
FIG. 1 is a perspective view of a chuck key handle assembly according to an embodiment of the disclosure.
Figure 2:
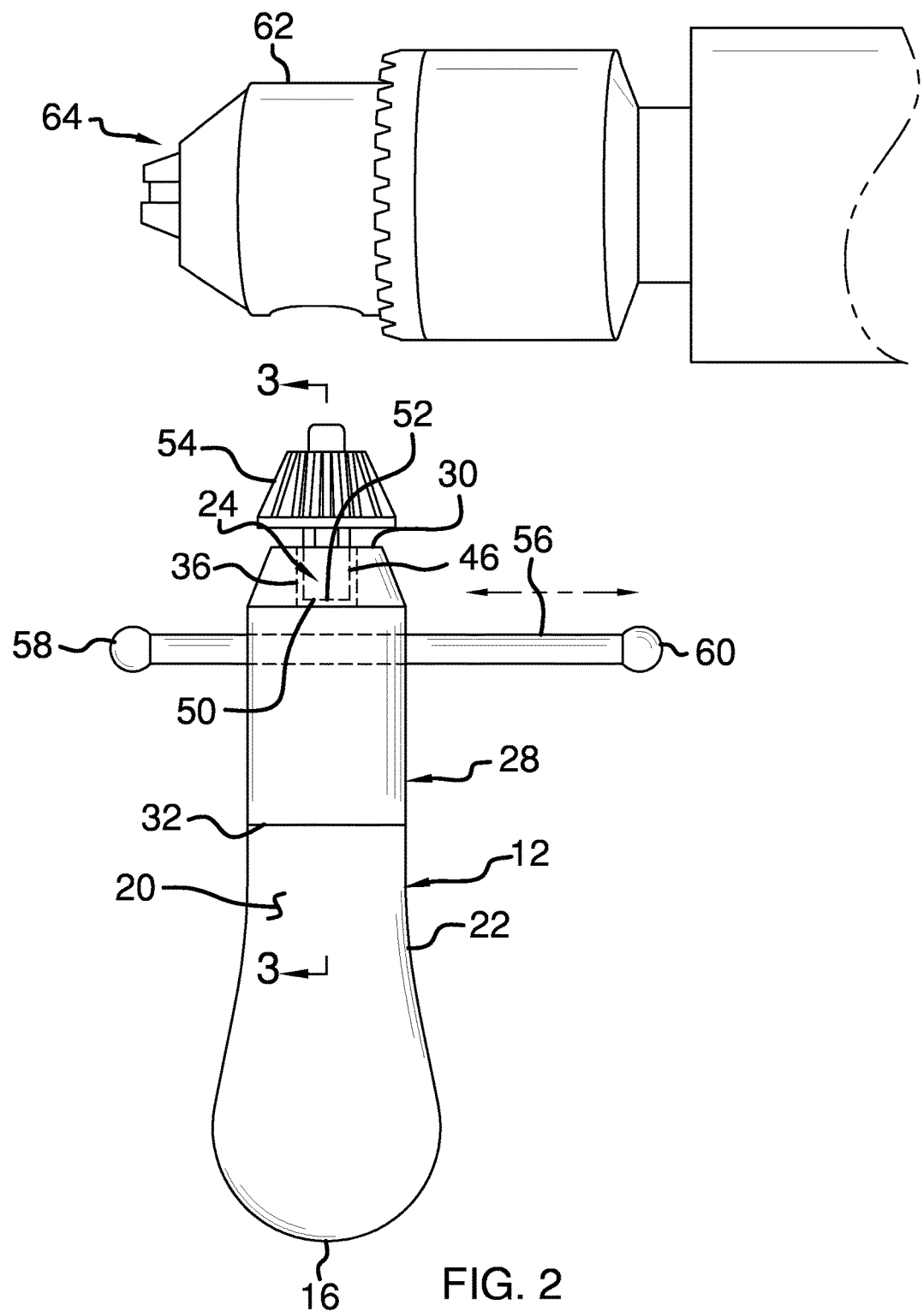
FIG. 2 is a right side view of an embodiment of the disclosure.
Figure 3:
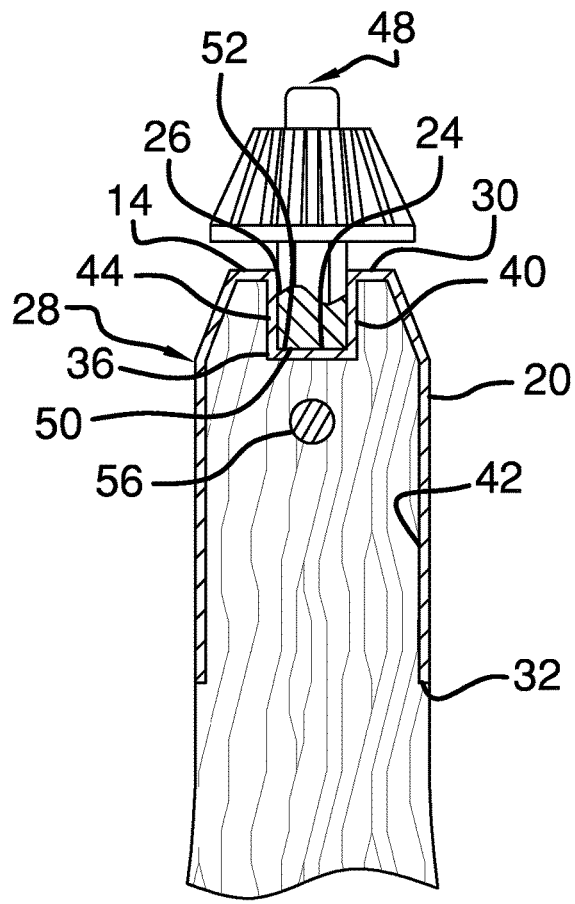
FIG. 3 is a cross sectional view taken along line 3-3 of FIG. 2 of an embodiment of the disclosure.
Figure 4:
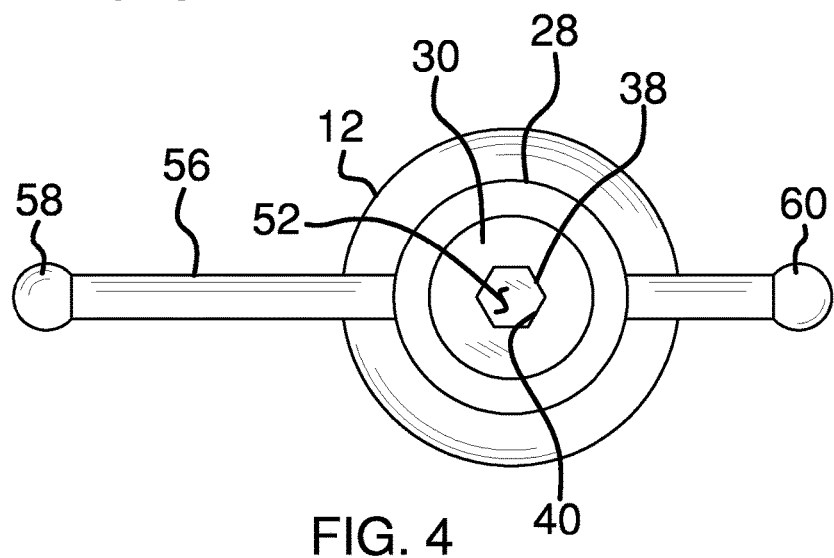
FIG. 4 is a top view of an embodiment of the disclosure.
Figure 5:
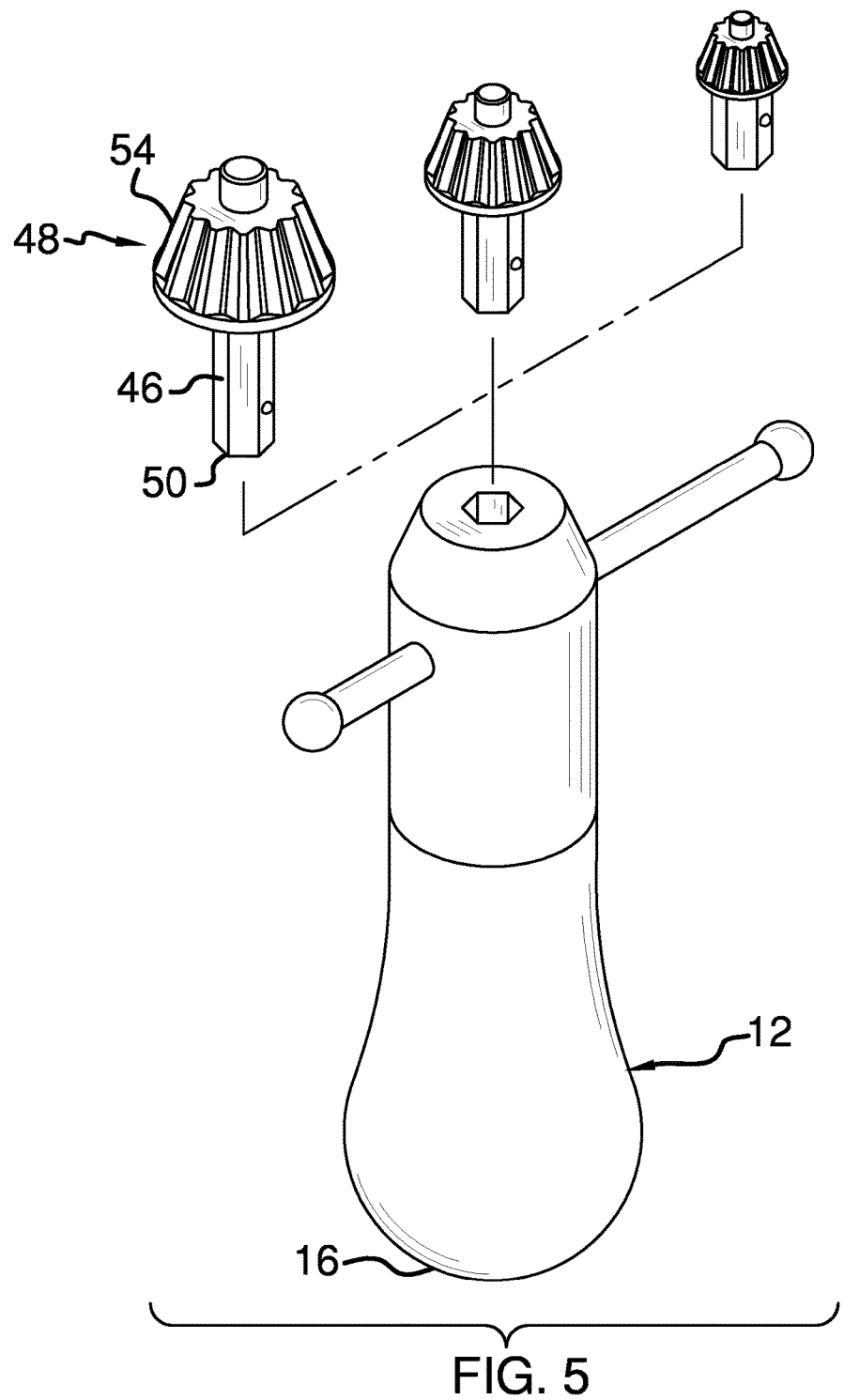
FIG. 5 is a top perspective view of an embodiment of the disclosure.

With reference now to the drawings, and in particular to FIGS. 1 through 5 thereof, a new handle device embodying the principles and concepts of an embodiment of the disclosure and generally designated by the reference numeral 10 will be described.

As best illustrated in FIGS. 1 through 5, the chuck key handle assembly 10 generally comprises a handle 12 that has a top end 14 and a bottom end 16. The handle 12 is elongated between the top 14 and bottom 16 ends. An outer surface 20 of the handle 12 curves outwardly proximate the bottom end 16 of the handle 12. The bottom end 16 of the handle 12 has a bulb shape.

The outer surface 20 of the handle 12 tapers inwardly toward the top end 14 of the handle 12. The top end 14 of the handle 12 has a diameter that is less than a diameter of a middle 22 of the handle 12. Additionally, the top end 14 of the handle 12 has a well 24 extending downwardly therein. A bounding surface 26 of the well 24 has a plurality of sides. The well 24 has a hexagonal shape.

A sleeve 28 is provided. The sleeve 28 has an upper end 30 and a lower end 32. The lower end 32 of the sleeve 28 is open. Additionally, the sleeve 28 is substantially hollow. The sleeve 28 tapers inwardly proximate the upper end 30 of the sleeve 28. The upper end 30 of the sleeve 28 has a diameter that is less than a middle 34 of the sleeve 28.

The sleeve 28 has a cup 36 extending downwardly from the upper end 30 of the sleeve 28. The cup 36 is centrally positioned on the upper end 30 of the sleeve 28. An uppermost end 38 of the cup 36 is open. An exterior wall 40 of the cup 36 has a plurality of sides. The cup 36 has a hexagonal shape.

The lower end 32 of the sleeve 28 insertably receives the top end 14 of the handle 12. The outer surface 20 of the handle 12 abuts an inner surface 42 of the sleeve 28. The sleeve 28 is coupled to the handle 12. The cup 36 on the sleeve 28 is positioned within the well 24 in the handle 12. An outside surface 44 of each of the plurality of sides of the exterior wall 40 of the cup 36 abuts an associated one of the plurality of sides of the bounding surface 26 of the well 24.

A shaft 46 on a chuck key 48 is removably insertable into the uppermost end 38 of cup 36 on the sleeve 28. A bottom end 50 of the shaft 46 on the chuck key 48 engages a bottommost surface 52 of the cup 36. A gear 54 on the chuck key 48 is spaced upwardly from the upper end 30 of the sleeve 28. The shaft 46 on the chuck key 48 engages each of the plurality of sides of the exterior wall 40 of the cup 36 so the chuck key 48 is coupled to the handle 12. The handle 12 applies a rotational torque to the chuck key 48. Finally, the chuck key 48 may be a drill chuck key of any conventional design.

A rod 56 is provided. The rod 56 has a first end 58 and a second end 60. The rod 56 is elongated between the first 58 and second 60 ends. Each of the first 58 and second 60 ends of the rod 56 are rounded into a ball shape. The rod 56 extends laterally through the sleeve 28 proximate the upper end 30 of the sleeve 28 so the rod 56 extends through the handle 12. The rod 56 is slidably coupled to the handle 12.

In use, the handle 12 is positionable so the gear 54 on the chuck key 48 engages a chuck 62 on a tool 64. The tool 64 may be an electric drill of any conventional design. The rod 56 is gripped by a user so the user may rotate the handle 12 after the chuck key 48 engages the chuck 62 on the tool 64. The user rotates the handle 12 so the chuck key 48 opens and closes the chuck 62 on the tool 64. The handle 12 allows the user to apply an increased rotational torque to the chuck key 48 so the chuck 62 on the tool 64 may be fully tightened to prevent slippage of a bit in the chuck 62. The handle 12 accommodates various sizes of chuck keys 48.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A chuck key handle assembly configured to insertably receive the chuck key wherein a user may apply an increased amount of rotational torque to a chuck on a tool, said assembly comprising:
   a handle configured to insertably receive the chuck key such that the chuck key may engage the chuck on the tool;
   a rod operationally coupled to said handle, said rod being gripped by a user wherein the user may rotate said handle after the chuck key engages the chuck, said rod having a first end and a second end, said rod being elongated between said first and second ends;
   a lower end of a sleeve insertably receiving a top end of said handle such that an outer surface of said handle abuts an inner surface of said sleeve, said sleeve being coupled to said handle;
   a cup on said sleeve being positioned within a well in said handle such that an outside surface of each of a plurality of sides of an exterior wall of said cup abuts an associated one of a plurality of sides of a bounding surface of said well; and
   said rod extending laterally through a sleeve proximate an upper end of said sleeve such that said rod extends through said handle.

2. The assembly according to claim 1, further comprising said handle having a top end and a bottom end, said handle being elongated between said top and bottom ends.

3. The assembly according to claim 1, further comprising a bounding surface of said well having a plurality of sides such that said well has a hexagonal shape.

4. The assembly according to claim 1, further comprising said sleeve having an upper end, said lower end of said sleeve being open, said sleeve being substantially hollow.

5. The assembly according to claim 1, further comprising said cup extending downwardly from an upper end of said sleeve, said cup being centrally positioned on said upper end of said sleeve, an uppermost end of said cup being open.

6. The assembly according to claim 5, further comprising an exterior wall of said cup having a plurality of sides such that said cup has a hexagonal shape.

7. The assembly according to claim 1, further comprising a shaft on the chuck key being removably insertable into said cup in said sleeve such that a bottom end of the shaft on the chuck key engages a bottommost surface of said cup, a gear on the chuck key being spaced upwardly from an upper end of said sleeve.

8. The assembly according to claim 7, further comprising the shaft on the chuck key engaging each of a plurality of sides of an exterior wall of said cup such that the chuck key is coupled to said handle, said handle applying a rotational torque to the chuck key.

9. The assembly according to claim 1, further comprising said handle being positionable such that a gear on the chuck key engages the chuck on the tool, the user rotating said handle such that the chuck key opens and closes the chuck on the tool.

10. A chuck key handle assembly configured to insertably receive the chuck key wherein a user may apply an increased amount of rotational torque to a chuck on a tool, said assembly comprising:
    a handle having a top end and a bottom end, said handle being elongated between said top and bottom ends, said top end of said handle having a well extending downwardly therein, a bounding surface of said well having a plurality of sides such that said well has a hexagonal shape;
    a sleeve having an upper end and a lower end, said lower end of said sleeve being open, said sleeve being substantially hollow;
    said sleeve having a cup extending downwardly from said upper end of said sleeve, said cup being centrally positioned on said upper end of said sleeve, an uppermost end of said cup being open, an exterior wall of said cup having a plurality of sides such that said cup has a hexagonal shape;
    said lower end of said sleeve insertably receiving said top end of said handle such that an outer surface of said handle abuts an inner surface of said sleeve, said sleeve being coupled to said handle, said cup on said sleeve being positioned within said well in said handle such that an outside surface of each of said plurality of sides of said exterior wall of said cup abuts an associated one of said plurality of sides of said bounding surface of said well;
    a shaft on the chuck key being removably insertable into said cup in said sleeve such that a bottom end of the that shaft on the chuck key engages a bottommost surface of said cup, a gear on the chuck key being spaced upwardly from said upper end of said sleeve, the shaft on the chuck key engaging each of said plurality of sides of said exterior wall of said cup such that the chuck key is coupled to said handle, said handle applying a rotational torque to the chuck key;
    a rod having a first end and a second end, said rod being elongated between said first and second ends, said rod extending laterally through said sleeve proximate said upper end of said sleeve such that said rod extends through said handle; and
    said handle being positionable such that the gear on the chuck key engages the chuck on the tool, said rod being gripped by a user wherein the user may rotate said handle after the chuck key engages the chuck on the tool, the user rotating said handle such that the chuck key opens and closes the chuck on the tool.

\* \* \* \* \*